(12) United States Patent
Soulds et al.

(10) Patent No.: US 12,207,740 B2
(45) Date of Patent: Jan. 28, 2025

(54) SUPPORTING APPARATUS

(71) Applicant: Travel Babies, LLC, Boca Raton, FL (US)

(72) Inventors: Amber Soulds, Boca Raton, FL (US); Carl Tenbrink, Huntington Beach, CA (US)

(73) Assignee: Travel Babies, LLC, Boca Raton, FL (US)

( * ) Notice: Subject to any disclaimer, the term of this patent is extended or adjusted under 35 U.S.C. 154(b) by 275 days.

(21) Appl. No.: 17/866,542

(22) Filed: Jul. 17, 2022

(65) Prior Publication Data

US 2024/0016309 A1    Jan. 18, 2024

(51) Int. Cl.
| | | |
|---|---|---|
| A47D 1/02 | (2006.01) | |
| A47D 13/04 | (2006.01) | |
| A47D 13/10 | (2006.01) | |
| A63H 33/00 | (2006.01) | |

(52) U.S. Cl.
CPC ............. *A47D 1/02* (2013.01); *A47D 13/043* (2013.01); *A47D 13/107* (2013.01); *A63H 33/006* (2013.01); *A47D 13/101* (2022.08)

(58) Field of Classification Search
CPC ........ A47D 1/02; A47D 13/08; A47D 13/043; A47D 13/046; A47D 13/04; A47D 1/00; A47D 13/00; A47D 13/107; A47D 13/101; A47D 13/105; A47D 1/002; A47D 15/00; A47D 3/001; A47D 1/103; A47D 13/102; A47D 1/10; A47D 11/00; A47D 11/002; A01K 13/001; A47K 3/125; A47K 3/127; A47K 3/034; A47K 3/024; A47K 3/064; A47K 3/122; A63H 33/006; Y10S 297/11
USPC .......... 5/655, 101; 4/659, 572.1, 579, 573.1, 4/594, 546; 297/274, 5, 273; 280/87.051; 482/69
See application file for complete search history.

(56) References Cited

U.S. PATENT DOCUMENTS

| | | | | |
|---|---|---|---|---|
| 3,747,596 | A * | 7/1973 | Mills | A47D 13/04 128/845 |
| 2008/0155743 | A1* | 7/2008 | Allen | A47K 3/127 4/578.1 |
| 2018/0177347 | A1* | 6/2018 | Batiste | A47K 3/127 |

FOREIGN PATENT DOCUMENTS

| | | | | |
|---|---|---|---|---|
| WO | WO-2012037522 A1 | * | 3/2012 | ............... A47D 9/02 |
| WO | WO-2016125026 A1 | * | 8/2016 | ............... A47D 1/02 |

\* cited by examiner

*Primary Examiner* — Adam C Ortiz
*Assistant Examiner* — Madison Emanski
(74) *Attorney, Agent, or Firm* — Choi Capital Law PLLC; Kevin J Fournier

(57) ABSTRACT

The disclosed embodiments of the invention relate to a supporting apparatus and methods of using it. The supporting apparatus may include a frame member including an outer periphery and an inner periphery. The supporting apparatus may further include a first leg assembly and a second leg assembly, each configurable between a closed position and an open position. The supporting apparatus may further include a suspender that may be fastened to the frame member through a plurality of straps. The suspender may include a central member that may be positioned in a region enclosed by the inner periphery of the frame member.

16 Claims, 13 Drawing Sheets

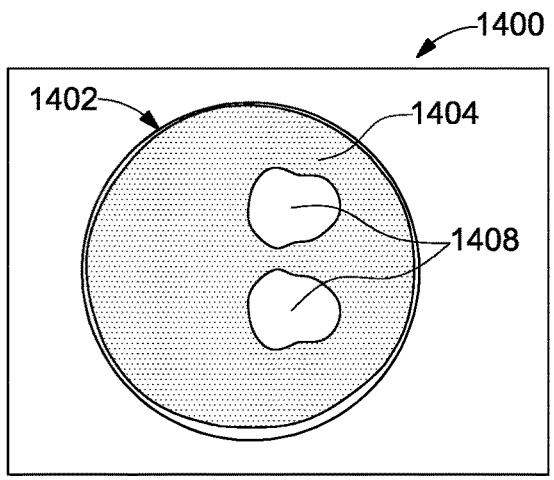 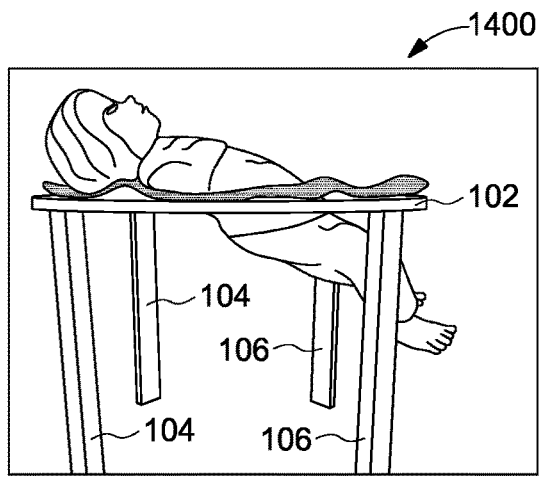
FIG. 14A · FIG. 14B
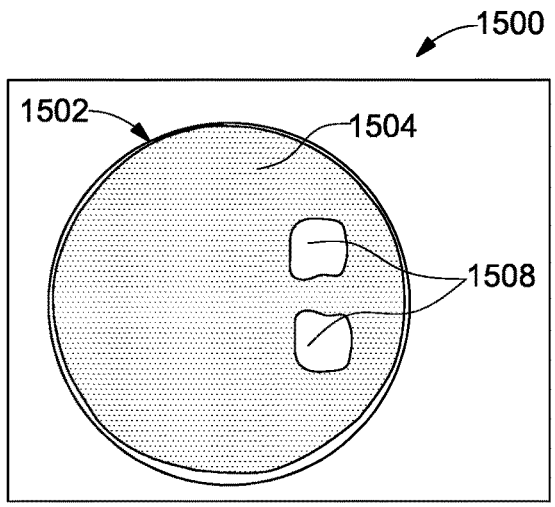 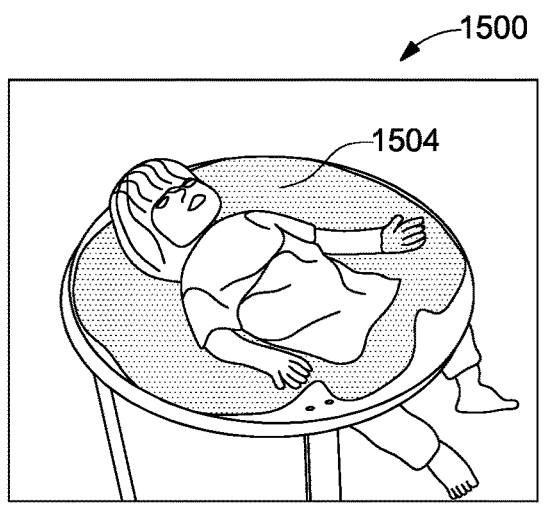
FIG. 15A · FIG. 15B
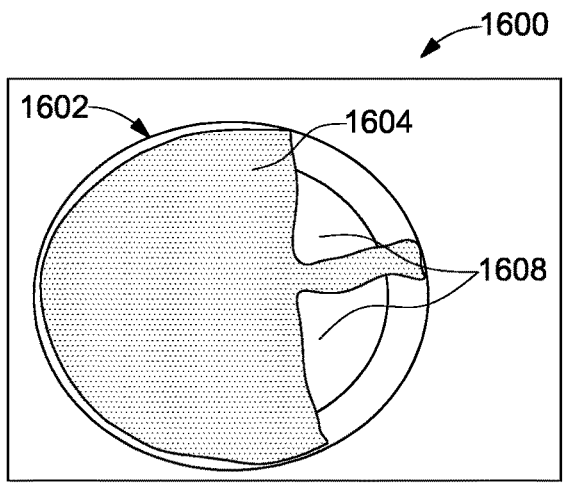 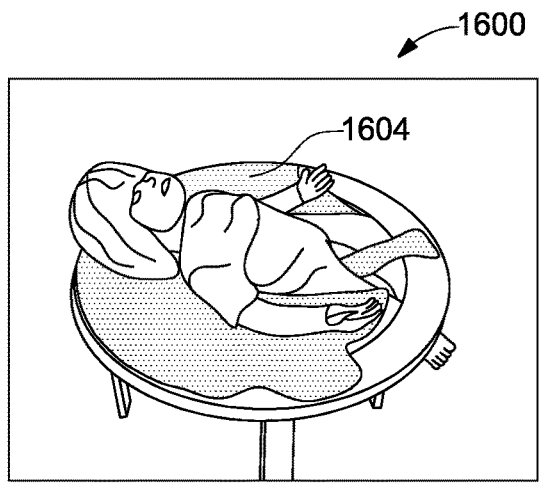
FIG. 16A · FIG. 16B

SUPPORTING APPARATUS

TECHNICAL FIELD

Embodiments of the invention relate generally to a supporting apparatus, and particularly to a portable and collapsible supporting apparatus that can be used for supporting and holding a user, for example, during bathing and travelling.

BACKGROUND

Taking care of certain users such as infants, elderly, and even pet animals may sometime require some sort of a physical support structure to hold their bodies. For example, when giving a bath, it may be convenient to support the user on such support structure, which ensures comfortable positioning and easy access for the user. Such users' muscles may not be strong enough to support their body. Moreover, such users may not be able to sit unsupported, which poses a challenge while performing certain activities, for instance, giving them a bath. Some devices, such as infant bath tubs, try to solve the problem to some extent; however, these devices being rigid, non-flexible structures, and typically made of molded plastic, do not provide a soft support that conforms to the user's body. Further, such devices lack portability and may not be carried easily while travelling.

Some foldable bathtubs are known which can accommodate the user in a single fixed position. However, interior of these foldable bathtubs lacks a structure, so the users who cannot sit by themselves are not well-supported. Moreover, foldable legs of such devices make them feel precarious to use.

Thus, a supporting apparatus is desired which can be used for supporting and holding a user, for example, an infant especially during travelling and bathing, is collapsible for easy storage and transportation, and is easily reconfigured into different customized shape to accommodate the user in different positions depending on the user's shape, size, and age, without requiring an expert intervention or usage of specialized tools.

SUMMARY

Embodiments of the invention are directed to a supporting apparatus, referred herein as supporting apparatus and methods of using it. In one embodiment, the supporting apparatus may include a frame member including an outer periphery and an inner periphery. The inner periphery may define a plane therewithin. The supporting apparatus may further include a first leg assembly and a second leg assembly, each movably attached to the frame member. Each of the first leg assembly and second leg assembly may be configurable between a closed position and an open position. The supporting apparatus may further include a suspender including a central member and a plurality of straps extending from the central member. In some embodiments, the suspender may be fastened to the frame member through the plurality of straps. The central member may be positioned in a region enclosed by the inner periphery of the frame member. A user may be supported in the region enclosed within the inner periphery of the frame member using the suspender. The inner periphery of the frame member may be configured in a closed shape or an open shape. In some embodiments, the closed shape may be substantially circular or substantially oval or a polygonal shape.

In the open position, each of the first leg assembly and the second leg assembly may be aligned at a first angle relative to the plane associated with the inner periphery. In the open position of the supporting apparatus, the frame member may be balanced on the first leg assembly and the second leg assembly, and the frame member may be raised from ground level by a predetermined height. In the closed position, each of the first leg assembly and the second leg assembly may be aligned at a second angle relative to the plane associated with the inner periphery. The second angle may range between about 0° to about 10°.

Each of the first leg assembly and the second leg assembly may be of a desired shape. In some embodiments, the leg assembly may be a U-shaped structure or a rectangular shaped structure. The leg assembly may include an intermediary section, a first leg section and a second leg section, each extending away from the intermediary section. The leg assembly may be coupled to the frame member at the intermediary section using a coupling mechanism.

In some embodiments, the supporting apparatus may further include a locking mechanism associated with each of the first leg assembly and the second leg assembly. The locking mechanism may be configured to secure each of the first leg assembly and the second leg assembly in the open position and the closed position. The locking mechanism may include a catch including a first end and a second end. The first end may be configured to engage with a first slot and a second slot. The second end may define a handle. The catch may be movable between an extended position and a retracted position. The locking mechanism may further include a spring coupled to the catch and configured to bias the catch in the extended position. The first end of the catch may be configured to engage with one of the first slot and the second slot, when the catch is in the extended position. The first slot and the second slot may correspond to the open position and the closed position of the leg assembly, respectively. The catch may be configured to be moved from the extended position to the retracted position by manipulating a handle against the spring.

In some embodiments, the support apparatus may further include a suction cup assembly. The suction cup assembly may be configured to be removably attached to each of the first leg section and the second leg section associated with each of the first leg assembly and the second leg assembly.

In some embodiments, the frame member of the apparatus may further include a neck-support section positioned on an upper side of the frame.

In some embodiments, the suspender of the supporting apparatus may further include at least one opening, wherein each of the at least one opening is configured to allow a limb of a user to pass through.

In another embodiment of the invention, the supporting apparatus may include a frame member, which may be configured in a closed shape. The frame member may include an outer periphery and an inner periphery. The apparatus may further include a first leg assembly and a second leg assembly, each pivotably attached to the frame member. Each of the first leg assembly and the second leg assembly may be pivotable between a closed position and an open position. In the open position, each of the first leg assembly and the second leg assembly may be aligned away from the frame member. Further, in the open position, the frame member may be balanced on the first leg assembly and the second leg assembly, and the frame member may be raised from ground level by a predetermined height. In the closed position, each of the first leg assembly and the second leg assembly may be aligned towards the frame member.

The supporting apparatus may further include a suspender including a central member and a plurality of straps extending from the central member. In one embodiment, the suspender may be fastened to the frame member through the plurality of straps. The central member may be positioned in a region enclosed by the inner periphery of the frame member. A user may be supported in the region enclosed within the inner periphery of the frame member using the suspender.

BRIEF DESCRIPTION OF THE DRAWINGS

The following descriptions of certain embodiments of the invention taken in conjunction with the accompanying drawings provide a further understanding of the features of the invention and the manner of attaining them. These illustrative examples, together with the detailed description, further explain the features of the invention. No attempt is made to show structural details in more detail than is necessary for a fundamental understanding of the invention and various ways in which it may be practiced. The following figures of the drawings include:

FIG. 14A illustrates a top view of a supporting apparatus with an example of a suspender, in accordance with an embodiment of the invention;

FIG. 14B illustrates a side view of the supporting apparatus of FIG. 14A with a user in the suspender, in accordance with an embodiment of the invention;

FIG. 15A illustrates a top view of a supporting apparatus with another example of a suspender, in accordance with an embodiment of the invention;

FIG. 15B illustrates a perspective view of the supporting apparatus of FIG. 15A with a user in the suspender, in accordance with an embodiment of the invention;

FIG. 16A illustrates a top view of a supporting apparatus with another example of a suspender, in accordance with an embodiment of the invention;

FIG. 16B illustrates a perspective view of the supporting apparatus of FIG. 16A with a user in the suspender, in accordance with an embodiment of the invention;

DETAILED DESCRIPTION

Figure 1:
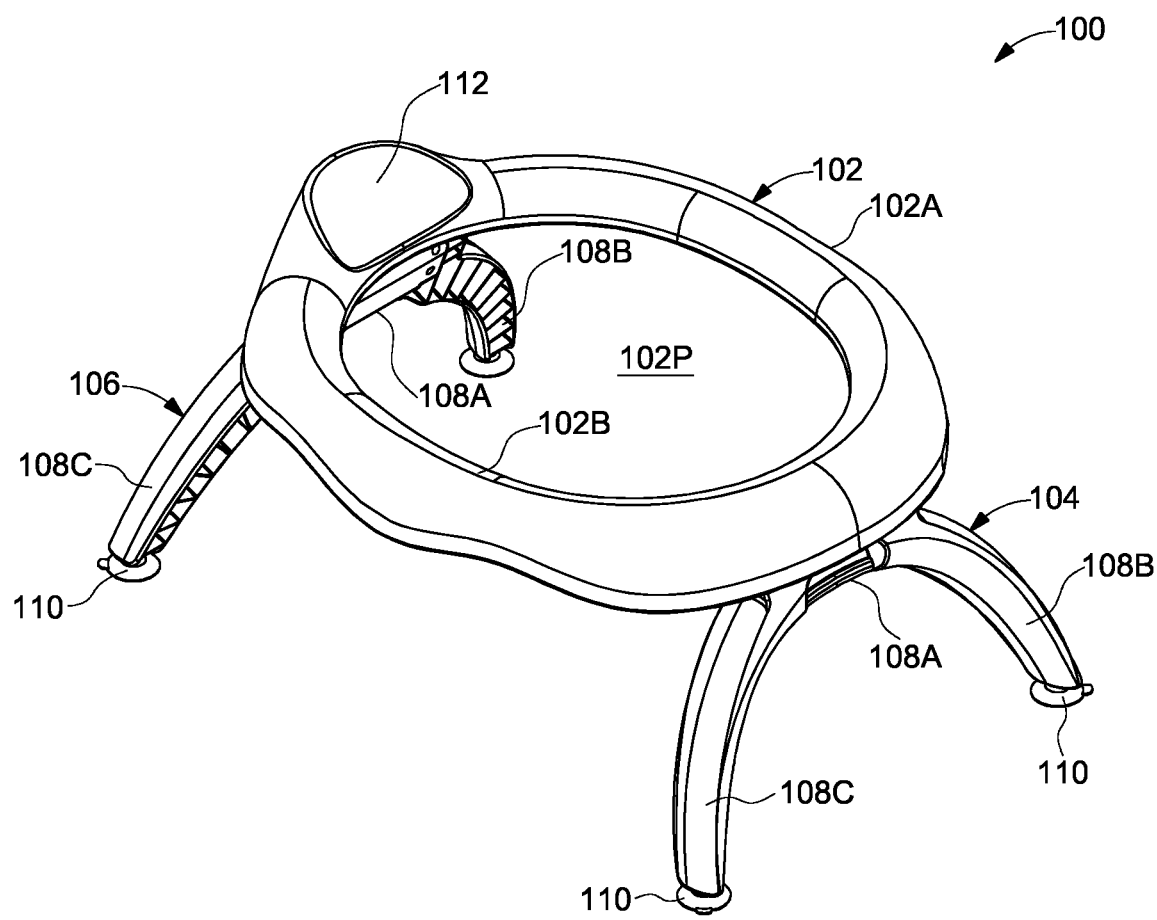
FIG. 1 illustrates an isometric view of a supporting apparatus, in accordance with an embodiment of the invention.
Figure 2:
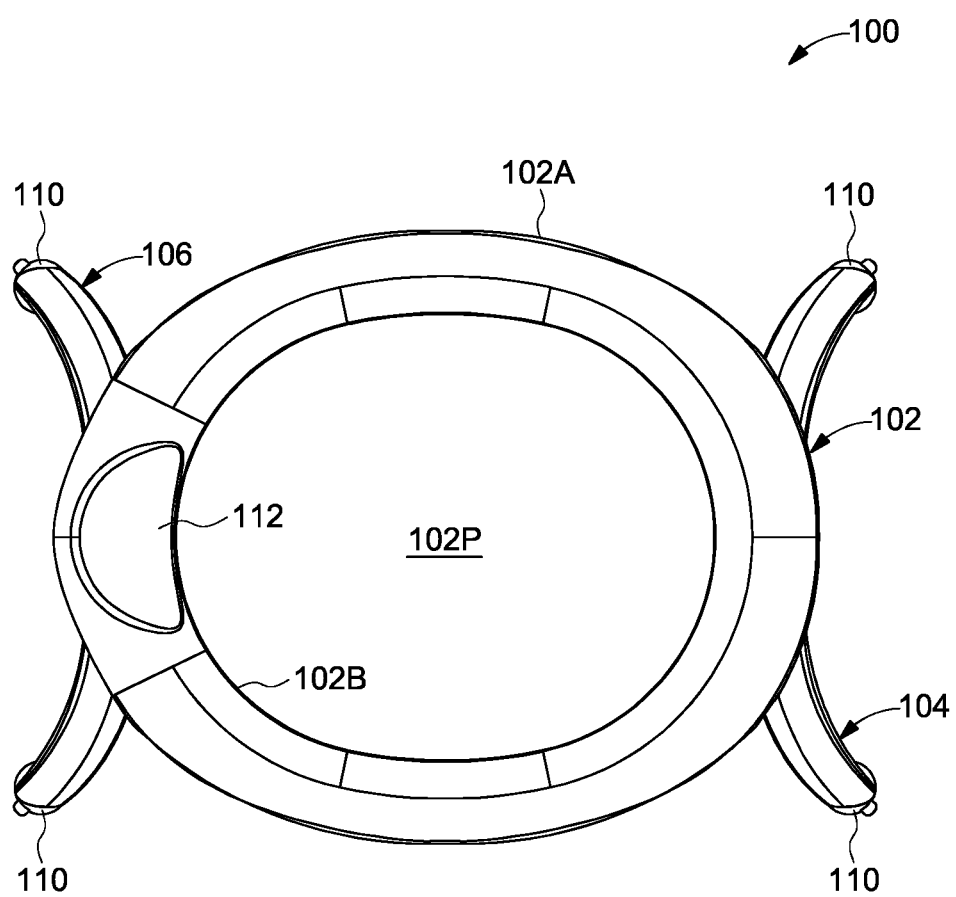
FIG. 2 illustrates a top view of the supporting apparatus of FIG. 1, in accordance with an embodiment of the invention.
Figure 3:
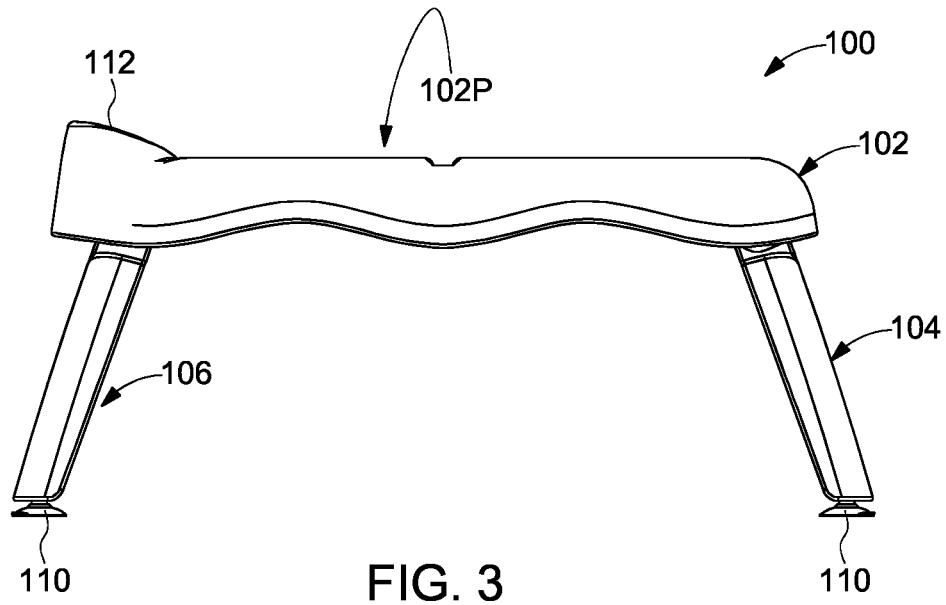
FIG. 3 illustrates a side view of the supporting apparatus of FIG. 1, in accordance with an embodiment of the invention.
Figure 4:
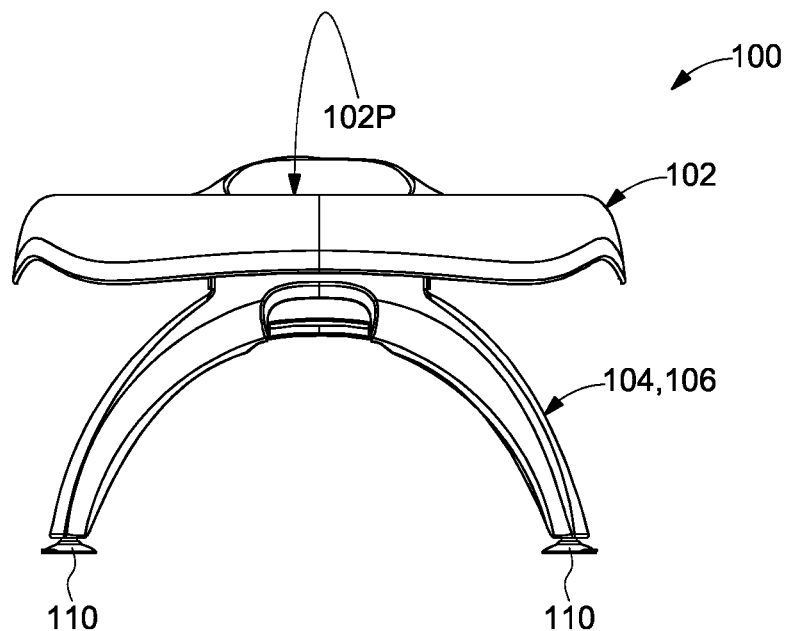
FIG. 4 illustrates a front view of the supporting apparatus of FIG. 1, in accordance with an embodiment of the invention.

Certain details are set forth below to provide a sufficient understanding of embodiments of the invention, with reference to the accompanying drawings, in which some, but not all embodiments of the invention are illustrated. While examples and features of certain embodiments are described herein, modifications, adaptations, and other implementations are possible and thus the invention should not be construed as limited to the embodiments set forth herein. These embodiments are provided as illustrative examples only to satisfy applicable legal requirements. Wherever convenient, the same reference numbers are used throughout the drawings to refer to the same or like parts. Further, it will be readily understood to a person of skill in the art that the components of the embodiments as generally described herein and illustrated in the drawings, could be arranged and designed in a wide variety of different configurations. Indeed, it will be clear to one skilled in the art that the embodiments of the invention may be practiced without various of the particular details described herein. The detailed descriptions provided herein and illustrated in the accompanying drawings are representative of the embodiments of the invention and do not limit the scope of the invention.

The disclosed embodiments of the invention relate to a supporting apparatus and methods of using it, wherein the supporting apparatus comprises a frame member, a leg assembly, and a suspender. In some embodiments of the invention, the supporting apparatus may be used for supporting and holding a user during tasks such as giving bath to a user, is collapsible for easy storage and transportation, and is easily reconfigurable into different customized shapes and sizes to accommodate the user in different positions, depending on the user's shape, size, and age without requiring an expert intervention or usage of specialized tools. In certain other embodiments, it is desirable to provide a supporting apparatus which enables a user to be carried around safely in the supporting apparatus while travelling.

Referring now to FIGS. 1 through 4; an isometric view, a top view, a side view, and a front view, respectively, of a supporting apparatus 100, with each of a first leg assembly 104 and a second leg assembly 106 configured in an open position, are illustrated in accordance with an embodiment of the invention. For ease of explanation, the drawings of FIGS. 1 through 4 do not show a suspender, which is illustrated in FIGS. 13 through 19 and is described below in conjunction with FIGS. 13 through 19. By way of an example, the supporting apparatus 100 may be used upon positioning it inside a conventional bathtub to bathe a user. The user may be an infant, or an elderly person or a pet animal. In certain embodiments of the invention, the supporting apparatus 100 may be manufactured from a rigid material selected from a metal, an alloy, a plastic, a polymer, and other materials, but may not be limited thereto. In certain other embodiments, the supporting apparatus 100 may be manufactured from a lightweight material such as plastic, aluminum, wood, and other materials. In one particular example, the material of the apparatus 100 may be ABS plastic.

As illustrated in FIGS. 1 through 4, the supporting apparatus 100 includes a frame member 102. In some embodiments, the frame member 102 may be made from a lightweight material such as plastic, aluminum, wood, or other material. For instance, the frame member 102 may be manufactured from ABS plastic. In some embodiments, the frame member 102 may be configured in a closed shape. By way of example, the closed shape may be one of a substantially circular shape, a substantially oval shape, or a polygonal shape. In other embodiments, the frame member 102 may be configured in an open shape; for example, a semicircular shape. The frame member 102 may further include an outer periphery 102A and an inner periphery 102B. By way of example, in the embodiment of the invention illustrated in FIG. 2, the frame member 102 is configured in a closed shape which is a substantially oval shape. As such, the frame member 102 includes the outer periphery 102A and the inner periphery 102B, both configured in the substantially oval shape. Further, in some other embodiments, the frame member 102 may have a curved surface at its outer periphery 102A for aesthetic purpose.

As further illustrated in FIGS. 1 through 4, the inner periphery 102B may define a plane 102P therewithin. For example, the frame member 102 may have a substantially flat configuration along the plane 102P such that the outer periphery 102A, the inner periphery 102B and the plane 102P are roughly in the same plane. For an ease of understanding, the frame member 102 of these embodiments may be considered to have a substantially two-dimensional shape. In certain other embodiments, (not illustrated in FIGS. 1 through 4) the frame member 102 may not have a flat configuration but may have a convoluted configuration which may not lie along a plane; and, therefore, the inner periphery 102B may not define a single plane. For an ease of understanding, the frame member 102, and, hence, the inner periphery 102B, of these embodiments, may be considered to extend in different dimensions.

In some embodiments, the supporting apparatus 100 may further include a neck-support section 112 positioned on an upper side of the frame member 102. A removable or fixed neck-support cushion pad may be provided at the neck-support section 112 for supporting neck and head of the user. By way of example, fastening mechanisms like zippers, Velcro®, or any other attachment means readily known in the art may be used to hold the removable neck-support cushion pad against the neck-support section 112. The neck-support cushion pad may be fabricated from material with desirable properties, such as a soft, elastic and padded material known in the art. For example, the neck-support cushion pad may be manufactured from an elastomer such as natural rubber, styrene-butadiene block copolymers, polyisoprene, neoprene, polybutadiene, ethylene propylene rubber, ethylene propylene diene rubber, silicone elastomers, fluoroelastomers, polyurethane elastomers, polyvinyl chloride, nitrile rubbers, and other such material. Further, in some embodiments, the neck-support cushion pad may be inflatable, by blowing air using a valved opening, a pump, or other means.

The supporting apparatus 100 may further include a first leg assembly 104 and a second leg assembly 106. In some embodiments, each of the first leg assembly 104 and the second leg assembly 106 may be movably attached to the frame member 102. Further, each of the first leg assembly 104 and second leg assembly 106 may be configurable between a closed position and an open position. In other words, each of the first leg assembly 104 and the second leg assembly 106 may be configured to extend downward and provide support to the supporting apparatus 100 in the open position. The first leg assembly 104 and the second leg assembly 106 may be attached to bottom of the frame member 102.

As illustrated in FIGS. 1 through 4, the leg assembly 108 (the first leg assembly 104, the second leg assembly 106) may include an intermediary section 108A, a first leg section 108B extending away from the intermediary section 108A, and a second leg section 108C extending away from the intermediary section 108A. As such, in some embodiments, the leg assembly 108 may have a U-shaped configuration defined by the first leg section 108B, the intermediary section 108A, and the second leg section 108C. In certain other embodiments, other shapes, such as a rectangular shape, may also be used for the leg assembly 108. In some embodiments, as illustrated in FIGS. 1 through 4 the first leg section 108B and the second leg section 108C may each further include a concave suction cup 110 that sticks to a resting surface to prevent the leg assembly 104 and 106 from slipping or moving when in an open position.

In some embodiments, the first leg section 108B and the second leg section 108C may be manufactured jointly i.e., as single unit. While in some other embodiments, both the first leg section 108B and second leg section 108C may be manufactured separately and later joined with an attachment means known in the art such as rivets, bolts, and other means. In some embodiments, the apparatus 100 may include a third leg assembly, a fourth leg assembly, a fifth leg assembly and so on, i.e., additional separate legs to support the supporting apparatus 100.

It should be noted that the first leg section 108B and the second leg section 108C may be identical to each other, in terms of shape and size. In certain embodiments, each of the first leg section 108B and the second leg section 108C may be extendable, for example, using telescoping or other mechanisms known in the art, such that the apparatus 100 may be adjusted to several different heights. As will be described further below, this allows the supporting apparatus to accommodate users of different shapes and sizes, and according to comfort requirement for different users.

The leg assembly 108 may be attached to the frame member 102 through the intermediary section 108A to allow the leg assembly 108 to be configured into an open position or a closed position. In one embodiment, the leg assembly 108 may be coupled to the frame member 102 at the intermediary section 108A using a coupling mechanism. For example, the coupling mechanism may be a hinge coupling, a pivot coupling, a jaw coupling, a sleeve coupling, a disc coupling, a tire coupling, a gear coupling or other means of coupling, but not limited thereto. In other embodiments, the leg assembly 108 may be attached to the frame member 102 using other techniques known in the art, such as magnets, adhesives, mechanical fastening, welding, bonding and other techniques. In further embodiments, the leg assembly 108 may be removably attached to the frame member 102.

In some embodiments, once the first leg assembly 104 or the second leg assembly 106 is configured in a particular position (an open position or a closed position), the first leg assembly 104 or the second leg assembly 106 may further be secured in that position by using a locking mechanism. An example of a locking mechanism is illustrated in FIG. 5.

Figure 5:
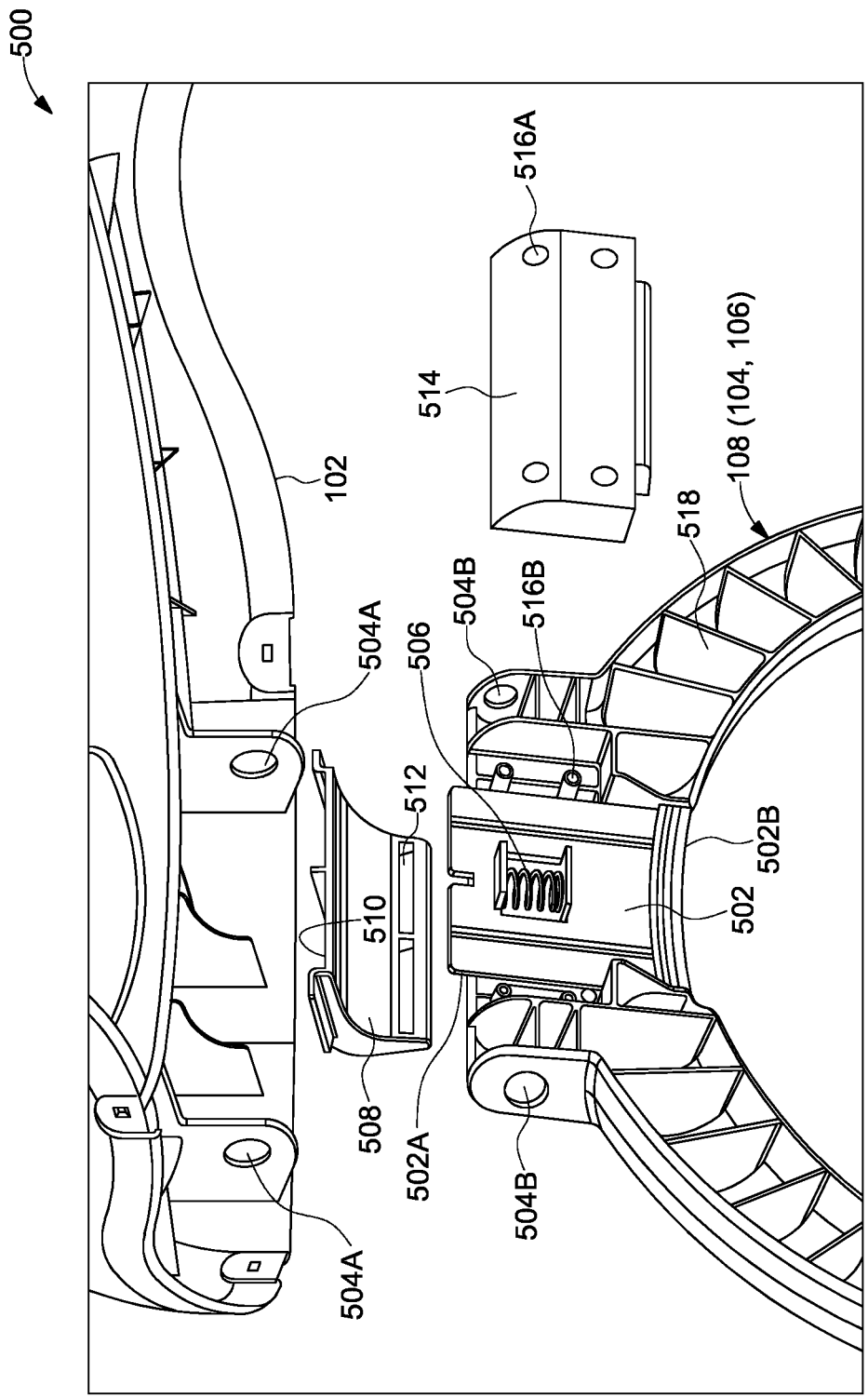
FIG. 5 illustrates an exploded view of a part of a supporting apparatus showing a locking mechanism, in accordance with an embodiment of the invention.

Referring now to FIG. 5, an exploded view of a part of a supporting apparatus 500 showing a locking mechanism is illustrated in accordance with an embodiment of the invention. In some embodiments, the locking mechanism may be used to secure each of the leg assembly 108 (the first leg assembly 104, the second leg assembly 106) in an open position, a closed position or both.

The locking mechanism, as illustrated in FIG. 5 in accordance with an embodiment of the invention, may include a catch 502, a spring 506, a first slot 510, and a second slot 512. The first slot 510 and the second slot 512 may correspond to the open position and the closed position of the leg assembly 108, respectively. The catch 502 may be an elongated structure defining a first end 502A and a second end 502B. The first end 502A of the catch 502 may be configured to engage with the first slot 510 and the second slot 512. The second end 502B of the catch 502 may be associated with a handle 502C. The catch 502 may be movable between an extended position and a retracted position. The spring 506 may be coupled to the catch 502 and may be configured to bias the catch 502 in the extended position. The catch 502 may be provided in the leg assembly 108. To reconfigure (move) the leg assembly 108 between the closed position and the open position, the catch 502 may be pulled, by manipulating the handle, into the retracted position from the extended position. As such, in the retracted position, the first end 502A of the catch 502 disengages from one of the first slot 510 or the second slot 512, therefore allowing the first end 502A of the catch 502 to slide on a curved surface 508 of the locking mechanism. The handle 502C may be released, once the first end 502A of the catch 502 is disengaged from one of the first slot 510 or the second slot 512 and is in contact with the curved surface 508 of the locking mechanism. Further, once the first end 502A of the catch 502 approaches the other of the first slot 510 or the second slot 512, the spring 506 causes the catch to be reconfigured into the extended position and thereby causing the first end 502A of the catch 502 to engage with the other of the first slot 510 or the second slot 512, thereby securing the leg assembly 108 in the open position or the closed position, respectively.

The supporting apparatus 100 may further include a cover 514 which may be configured to attach to the leg assembly 108 to cover and secure components of the locking mechanism. The cover 514 may provide protection to the components of the locking mechanism from physical damage from outside. In one embodiment, to attach the cover 514 to the leg assembly 108, the cover 514 may include a plurality of holes 516A that may allow a fastener, for example, a screw, a bolt, or a rivet, to pass through and fasten with the leg assembly 108.

As mentioned above, the leg assembly 108 may be movably attached to the frame member 102 using a coupling mechanism. In some embodiments, as also illustrated in FIG. 5, the coupling mechanism may be a hinge mechanism. The hinge mechanism may include a first set of holes 504A formed on the frame member 102 and a second set of holes 504B formed on the leg assembly 108. The hinge mechanism may further include a set of pins (not illustrated in FIG. 5) to couple the leg assembly 108 with the frame member 102, using the first set of holes 504A and the second set of holes 504B. For example, the set of pins may be positioned through the first set of holes 504A and the second set of holes 504B to thereby couple them to each other. In other embodiments, the leg assembly 108 may be coupled to the bottom of the frame member 102 by other attachment means known in the art, such as by screws or other fastening means.

In some embodiments, as also illustrated in FIG. 5, the leg assembly 108 may include a ribbed structure for rigidity and strength. For example, the leg assembly 108 may include a plurality of ribs 518 formed on the inside of a curved profile of the leg assembly.

As mentioned above, each of the first leg assembly 104 and the second leg assembly 106 may be configurable between an open position and a closed position. Certain details of the open position and the closed position are described in reference to FIGS. 6 and 7 and FIGS. 8 and 9, respectively.

Figure 6:
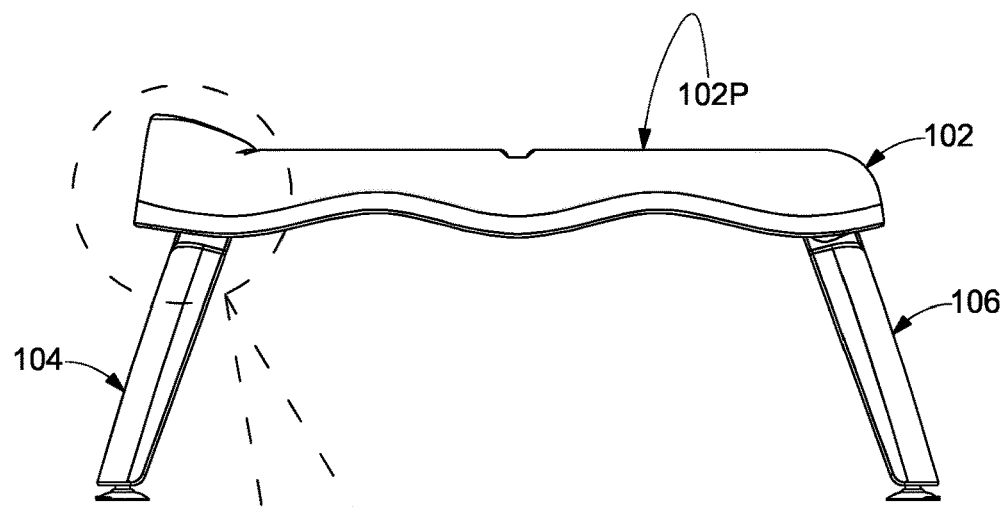
FIG. 6 illustrates a side view of the supporting apparatus of FIG. 1 with each of the first leg assembly and the second leg assembly configured in an open position, in accordance with an embodiment of the invention.

Referring now to FIG. 6, a side view of a supporting apparatus 100 with each of a first leg assembly 104 and a second leg assembly 106 configured in an open position is illustrated in accordance with an embodiment of the invention. As illustrated in FIG. 6, in the open position, each of the first leg assembly 104 and the second leg assembly 106 is aligned away from the frame member 102. In the open position, each of the first leg assembly 104 and the second leg assembly 106 is aligned at a first angle relative to the plane 102P associated with the inner periphery 102B. In some embodiments, the first angle may be equal to or greater than 90°, and preferably may range between about 100° to about 130°. In the open position, the frame member 102 may be balanced on the first leg assembly 104 and the second leg assembly 106. Further, in the open position, the frame member 102 may be raised from ground level by a predetermined height. The predetermined height may be varied by varying the first angle, the height of the leg assembly 108 (for example, using techniques known in the art, such as telescoping), or both. In some embodiments, once the first leg assembly 104 or the second leg assembly 106 is configured in the open position, the first leg assembly 104 or the second leg assembly 106 may further be secured in that position using a locking mechanism. Certain details of the locking mechanism are described in reference to FIG. 7.

Figure 7:
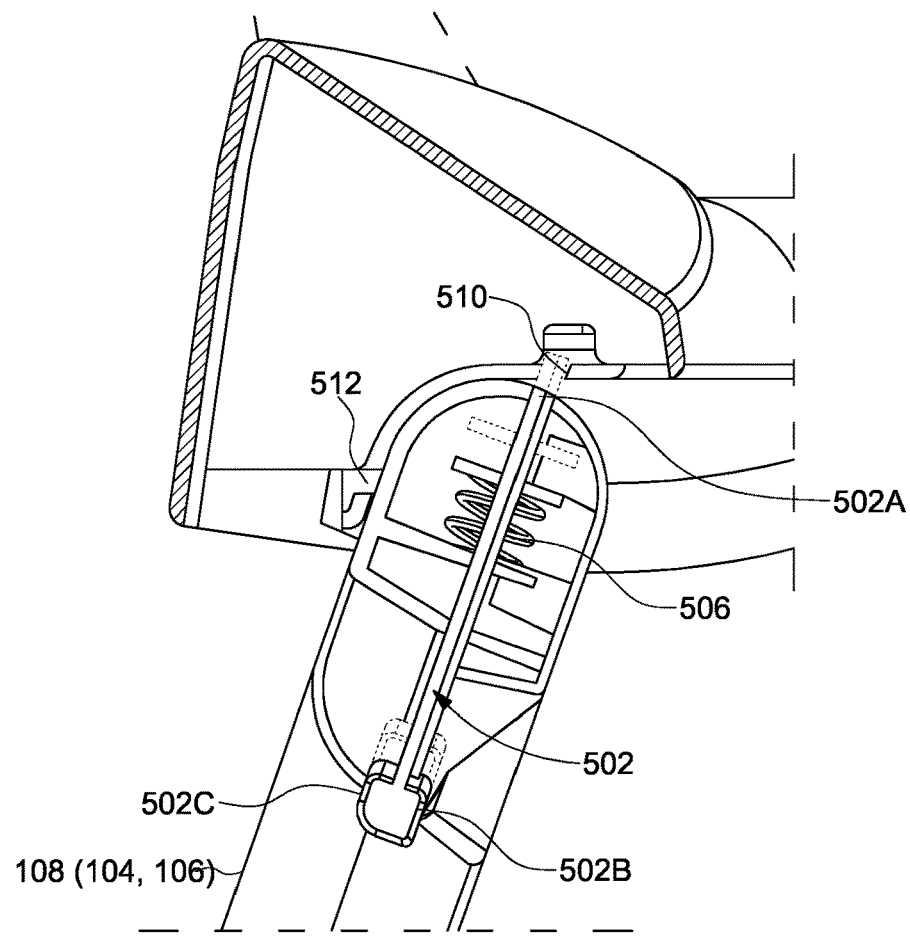
FIG. 7 illustrates a magnified sectional view of a part of the supporting apparatus of FIG. 6 showing a locking mechanism with a leg assembly configured in the open position, in accordance with an embodiment of the invention.

Referring now to FIG. 7, a magnified sectional view of a part of a supporting apparatus 100, with leg assembly 108 configured in an open position, showing a locking mechanism, is illustrated in accordance with an embodiment of the invention. As illustrated in FIG. 7, the locking mechanism may be used for securing each of the leg assembly 108 (the first leg assembly 104, the second leg assembly 106) in the open position. As explained above, to configure (move) the leg assembly 108 in an open position, the catch 502 may be pulled, by manipulating the handle 502C, into the retracted position from the extended position. In the retracted position, the first end 502A of the catch 502 is disengaged from the second slot 512, therefore allowing the first end 502A of the catch 502 to slide on the curved surface 508. The handle 502C may be released once the first end 502A of the catch 502 is disengaged from the second slot 512 and is in contact with the curved surface 508. Once the first end 502A of the catch 502 approaches the first slot 510, the spring 506 causes the catch to be reconfigured into the extended position and thereby causing the first end 502A of the catch 502 to engage with the first slot 510, thereby securing the leg assembly 108 in the open position.

Figure 8:
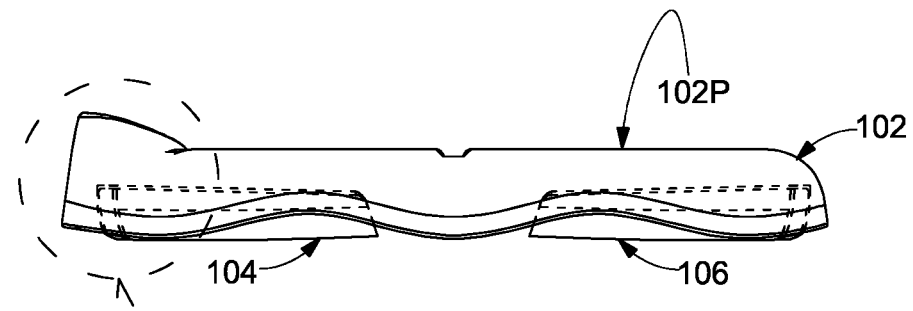
FIG. 8 illustrates a side view of a supporting apparatus with each of a first leg assembly and a second leg assembly configured in a closed position, in accordance with an embodiment of the invention.

Referring now to FIG. 8, a side view of a supporting apparatus 100 with each of a first leg assembly 104 and a second leg assembly 106 configured in a closed position is illustrated in accordance with an embodiment of the invention. As illustrated in FIG. 8, in the closed position, each of the first leg assembly 104 and the second leg assembly 106 is aligned towards the frame member 102, such that the first leg assembly 104 and the second leg assembly 106 are collapsed to be aligned substantially along the plane, 102P, associated with the inner periphery 102B. In the closed position, each of the first leg assembly 104 and the second leg assembly 106 is aligned at a second angle relative to the plane 102P associated with the inner periphery 102B. In some embodiments, the second angle may range between about 0° to about 10°, and preferably between about 0° to about 5°. This arrangement permits folding of the first leg assembly 104 and the second leg assembly 106 to put the supporting apparatus 100 in a compact configuration for easy handling, storage, and transportation. Further, it should be noted that the length of the leg assembly 108 (the first leg assembly 104, the second leg assembly 106) is such that the leg structure may be folded adjacent to the bottom of the frame member 102. For example, the length of the leg assembly 108 may be less than half of the length of the frame member 102. In some embodiments, once the first leg assembly 104 or the second leg assembly 106 is configured in the closed position, the first leg assembly 104 or the second leg assembly 106 may further be secured in that position using a locking mechanism. Certain details of the locking mechanism are described in reference to FIG. 9.

Figure 9:
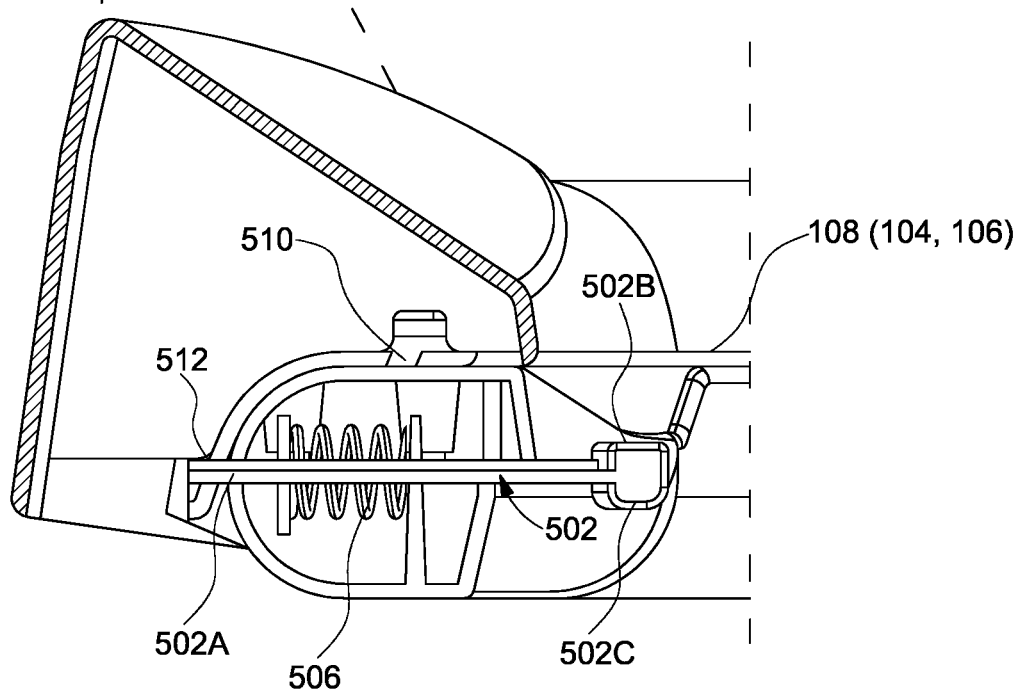
FIG. 9 illustrates a magnified sectional view of a part of the supporting apparatus of FIG. 8 showing a locking mechanism with a leg assembly configured in the closed position, in accordance with an embodiment of the invention.

Referring now to FIG. 9, a magnified sectional view of a part of a supporting apparatus 100, with leg assembly 108 configured in a closed position, showing a locking mechanism, is illustrated in accordance with an embodiment of the invention. As illustrated in FIG. 9, the locking mechanism may be used for securing each of the leg assembly 108 (the first leg assembly 104, the second leg assembly 106) in the closed position. As explained above, to configure (move) the leg assembly 108 into the closed position, the catch 502 may be pulled, by manipulating the handle 502C, into the retracted position from the extended position. As such, in the retracted position, the first end 502A of the catch 502 is disengaged from the first slot 510, therefore allowing the first end 502A of the catch 502 to slide on the curved surface 508. The handle 502C may be released once the first end 502A of the catch 502 is disengaged from one of the first slot 510 and is in contact with the curved surface 508. Further, once the first end 502A of the catch 502 approaches the second slot 512, the spring 506 causes the catch to be reconfigured into an equilibrium position (no-stretch position) causing the first end 502A of the catch 502 to engage with the second slot 512, securing the leg assembly 108 in the closed position.

Figure 10:
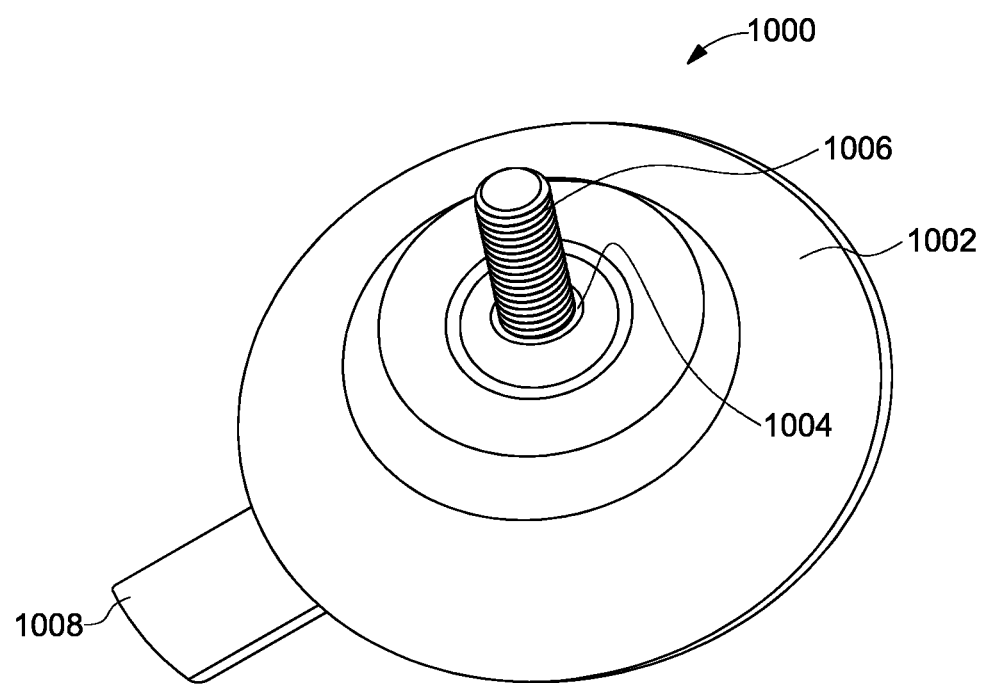
FIG. 10 illustrates a perspective view of an example of a suction cup assembly for a supporting apparatus, in accordance with an embodiment of the invention.

Referring now to FIG. 10, a perspective view of a suction cup assembly 1000 is illustrated in accordance with an embodiment of the invention. As illustrated in FIGS. 1 and 10, the suction cup assembly 1000 may be configured to be removably attached to each of a first leg section 108B and a second leg section 108C associated with each of a first leg assembly 104 and a second leg assembly 106. Further, the suction cup assembly 1000 may include a circular concave suction cup 1002 and a screw section 1006 provided along a bore 1004 defined in the center of the circular concave suction cup 1002. The concave suction cup 1002 may generally be cup-shaped. The concave suction cup 1002 may be made of a flexible synthetic material, such as polyvinyl chloride (PVC) plastic, rubber, neoprene, etc. The concave suction cup 1002 allows the leg assembly 108 and hence the supporting apparatus 100 to be stabilized by temporarily fixing to a resting surface (for example, floor of a bathtub) on which the supporting apparatus 100 may be used. The concave suction cup 1002 sticks to the resting surface to prevent the leg assembly 108 from slipping or moving.

As will be understood, the circular concave suction cup 1002 may temporarily fix to the resting surface by creating a vacuum. Therefore, to detach the circular concave suction cup 1002 from the resting surface, the vacuum must be released. To assist this, the suction cup assembly 1000 may further include a release-bar 1008 which may be manually pulled to cause to release the vacuum between the circular concave suction cup 1002 and the resting surface, and therefore, detach them.

Figure 11:
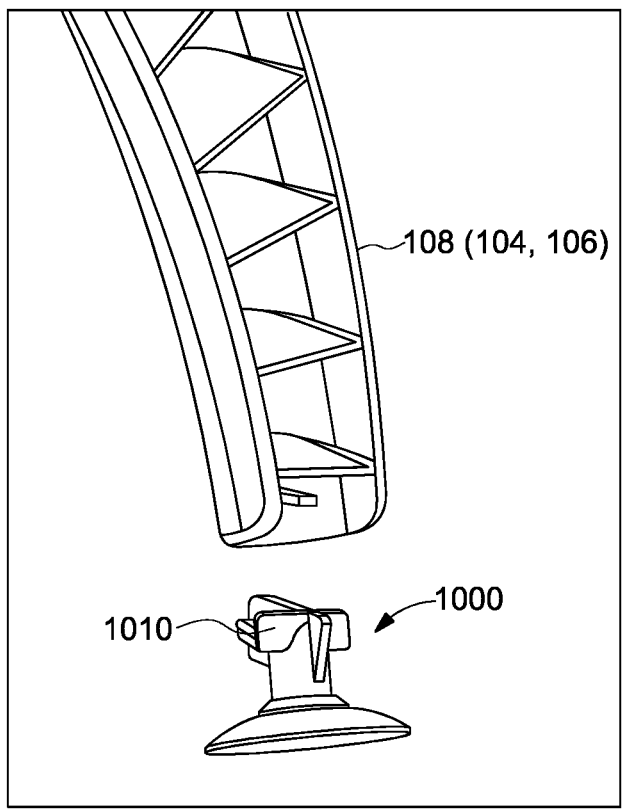
FIGS. 11 and 12 illustrate exploded views of a section of a supporting apparatus with an example of a suction cup assembly for the supporting apparatus, in accordance with an embodiment of the invention.
Figure 12:
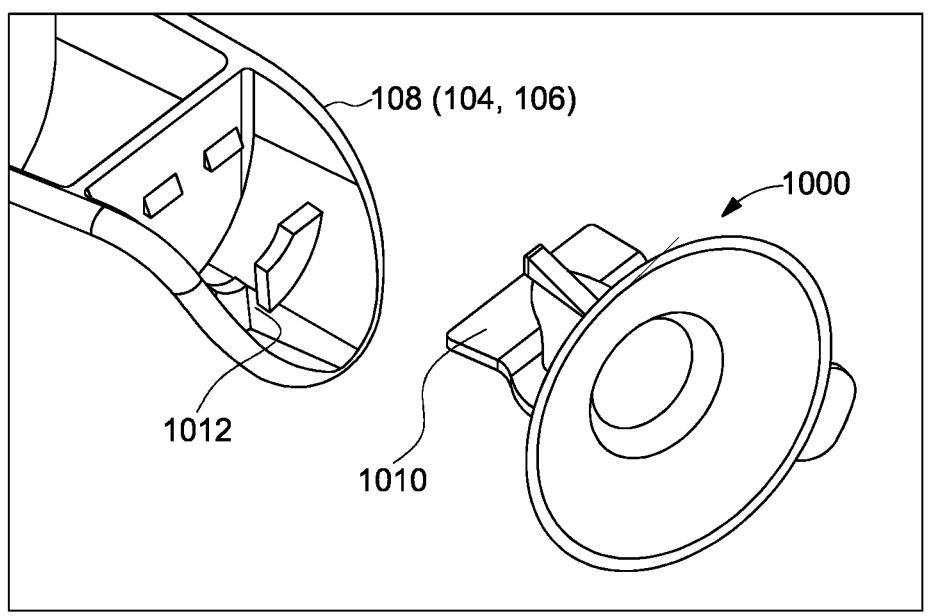

Referring now to FIGS. 11 and 12, exploded views of a section of a supporting apparatus 100 are illustrated in accordance with an embodiment of invention. As illustrated in FIGS. 11 and 12, the suction cup assembly 1000 may further include a first bracket 1010 that may be fastened on the screw section 1006. The first bracket 1010 may be a rigid structure, for example, having a threaded bore, that can accommodate the screw section 1006 to allow the first bracket 1010 to fasten to the screw section 1006. Further, the first bracket 1010 may be made from a rigid material such as steel, iron, aluminum, rigid plastic, or any other material. The first bracket 1010 may be engaged with a second bracket 1012 which may be built along lower end of each of the first leg section 108B and second leg section 108C of the leg assembly 108 (the first leg assembly 104, the second leg assembly 106). By way of engaging the first bracket 1010 with the second bracket 1012, the suction cup assembly 1002 can be detachably attached to the leg assembly 108.

Figure 13:
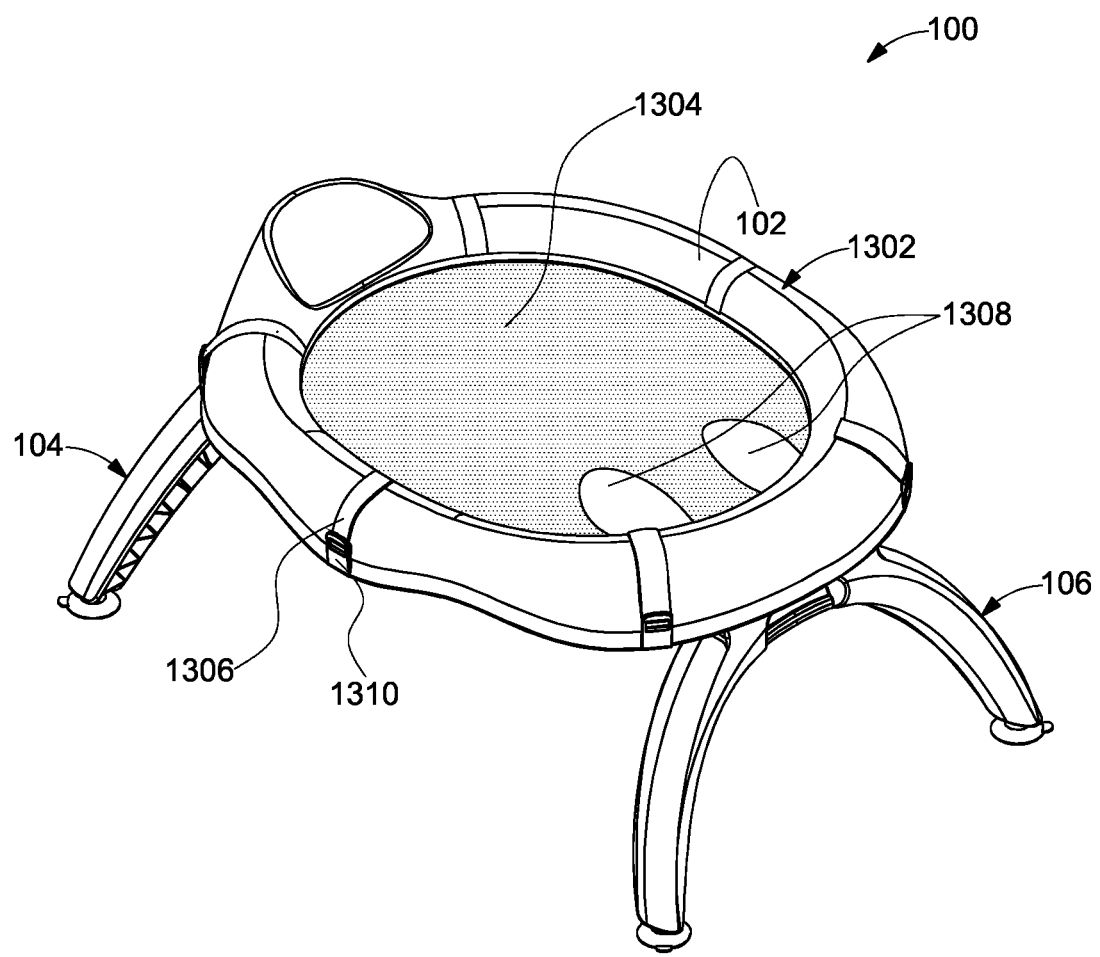
FIG. 13 illustrates a perspective view of a supporting apparatus, with a suspender, with each leg assembly in an open position, in accordance with an embodiment of the invention.

Referring now to FIG. 13, a perspective view of a supporting apparatus 100 including a suspender 1302 is illustrated in an open position in accordance with an embodiment of the invention. As illustrated in FIG. 13, the supporting apparatus 100 includes a frame member 102, a first leg assembly 104, a second leg assembly 106 and a suspender 1302. In some embodiments of the invention, the suspender 1302 may include a central member 1304 which may be configured to fit in the region enclosed within the inner periphery 102B of the frame member. Preferably, the central member 1304 may be made from a variety of materials in a variety of configurations to allow for the central member 1304 to dry quickly and for water to freely pass through when wet. For example, the central member 1304 may be made from a range of lightweight yet strong fabric, such as cotton, nylon, polyester, neoprene, canvas, or other fabric. Preferably, the fabric used is waterproof or water permeable. In some embodiments, the central member 1304 may have a mesh-like configuration. In certain other embodiments, the central member 1304 may be made of a washable and quick-drying cloth, to prevent mold and mildew growth. The central member 1304 may be made from a water-permeable elastic fabric that allows the water to freely pass through. In some embodiments, periphery of the central member 1304 may include a padded region for comfort. The padded region may serve as a soft non-slippery cushion to support a user's body, to prevent the user from sliding down and out of the supporting apparatus 100. The central member 1304 may also be easily folded to be packed in a compact manner for easy storage and portability.

The suspender 1302 may further include a plurality of straps 1306 to removably attach the suspender 1302 to the frame member 102. In some embodiments, each of the plurality of straps 1306 may further include a clip 1310 attached at one end of the each of the plurality of the straps 1306 to fasten the suspender 1302 to the frame member 102. To this end, in some embodiments, a plurality of strap guide grooves may be provided on the frame member 102 to accommodate the plurality of straps 1306 and the associated clips 1310. Other fastening techniques, generally known in the art, may be utilized to fasten the suspender 1302 to the frame member 102. The fastening techniques employed may include, for example, Velcro®, hooks, buttons, buckles, clasps, clamps, pins, adhesives, and other techniques. In certain other embodiments, the suspender 1302 may be permanently or irreversibly attached to the frame member 102. Once the suspender 1302 is attached to the frame member 102, a user may be supported in the region enclosed within the inner periphery of the frame member 102 on the suspender 1302, for example, like a hammock.

As further illustrated in FIG. 13, in some embodiments, the suspender 1302 may include at least one opening 1308 to accommodate a user. Further, each of the at least one opening 1308 may be configured to allow a limb of the user to pass through. For example, in the embodiment illustrated in FIG. 13, the suspender 1302 includes two openings 1308, for allowing two limbs of the user to pass through. With limbs through the openings 1308, the rest of the user's body may be supported by the central member 1304 of the suspender 1302 thereby comfortably situating the user on the supporting apparatus 100. As will be appreciated by a person of skill in the art, the shape, size, and number of openings 1308 may vary based on the shape, size, and age of the user, as well as based on the level of comfort desired. Certain details of different examples of suspender 1302 that as may be used in various embodiments of the invention are illustrated in FIGS. 14 through 19 and are described below.

Referring now to FIGS. 14A and 14B, a top view and a side view, respectively, of a supporting apparatus 1400 in an open position are illustrated in accordance with an embodiment of the invention. FIG. 14A is illustrated without a user, while FIG. 14B is illustrated with a user. The supporting apparatus 1400 includes a frame member 102, a first leg assembly 104, a second leg assembly 106, and a suspender 1402. The suspender 1402 may include a central member 1404 and which may further include two openings 1408. Each of the two openings 1408 is configured to allow legs of the user to pass through, as illustrated in FIG. 14B. The openings 1408 allow the user to lie down or sit at a steep angle, with the user's legs passing through the holes 1408. In some embodiments of the invention, the shape of the openings 1408 may be substantially oval. Alternatively, the openings 1408 may have any other suitable shape to accommodate the limbs of the user. Further, as illustrated in FIG. 14A, the openings 1408 may be positioned in one half of the central member 1404 towards the periphery of the central member 1404. In some embodiments, a ratio of minor axis of each of the opening 1408 to the diameter of the central member 1404 may range from about 1:5 to about 1:8. The location of the openings 1408, including the shape and size, may be determined for comfortable positioning of the user, on the suspender 1402, with sufficient support. In certain embodiments, in contrast to the seating position of the user as illustrated in FIG. 14B, the user may also be made to sit in an upright position by reversing the seating pattern.

Further, as illustrated in FIG. 14B, in some embodiments, a first leg assembly 104 and a second leg assembly 106 may be of a rectangular shaped.

Referring now to FIGS. 15A and 15B, a top view and a perspective view, respectively, of a supporting apparatus 1500 in an open position are illustrated in accordance with an embodiment of the invention. FIG. 15A is illustrated without a user, while FIG. 15B is illustrated with a user. As illustrated in FIG. 15A, a central member 1504 of a suspender 1502 includes two openings 1508 that are substantially square in shape. Further, a ratio of each side of the opening 1508 to the diameter of the central member 1504 may range from about 1:6 to about 1:9. Such configuration may be suited for a user of small size and may provide sufficient bottom support to the user. The location of the openings 1508, including the shape and size may be determined for comfortable positioning of the user, on the suspender 1502, with sufficient support.

Referring now to FIGS. 16A and 16B, a top view and a perspective view, respectively, of a supporting apparatus 1600 in an open position are illustrated in accordance with an embodiment of the invention. FIG. 16A is illustrated without a user, while FIG. 16B is illustrated with a user. As illustrated in FIG. 16A, a central member 1604 of a suspender 1602 includes two openings 1608 which may be generated, for example, by cutting two sectors of the central member 1604, each having a radius and an angle. In some embodiments, the ratio of the radius of the opening 1608 to the diameter of the central member 1604 may range from about 1:5 to about 1:8, and the angle formed in the opening 1608 between the two sides of the central member 1604 may be, preferably, equal to or less than 90 degrees.

Figure 17A:
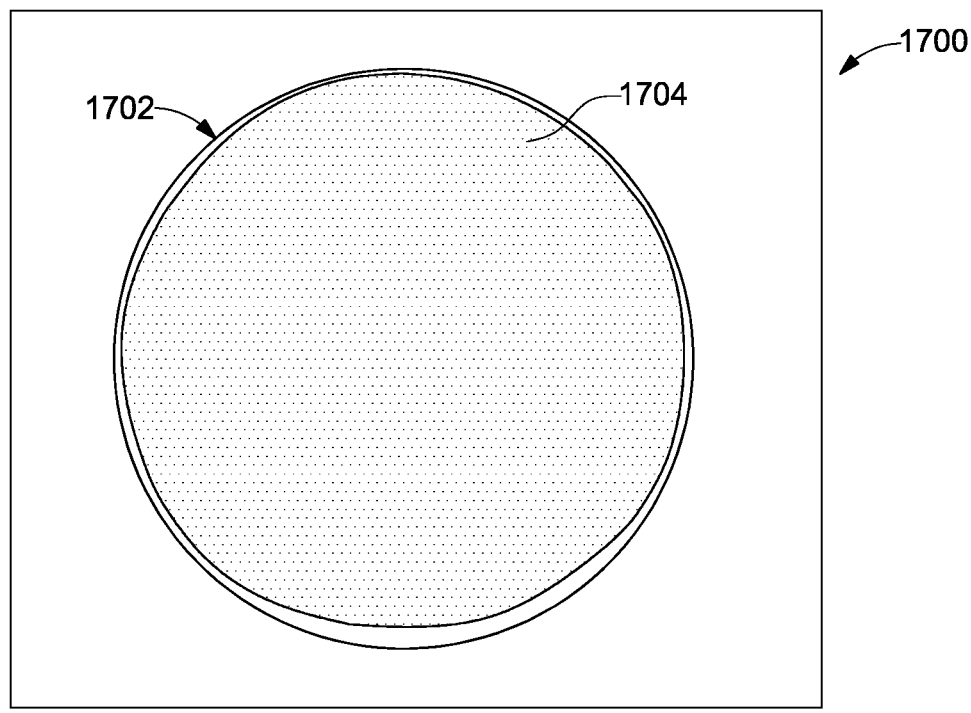
FIG. 17A illustrates a top view of a supporting apparatus with another example of a suspender, in accordance with an embodiment of the invention.
Figure 17B:
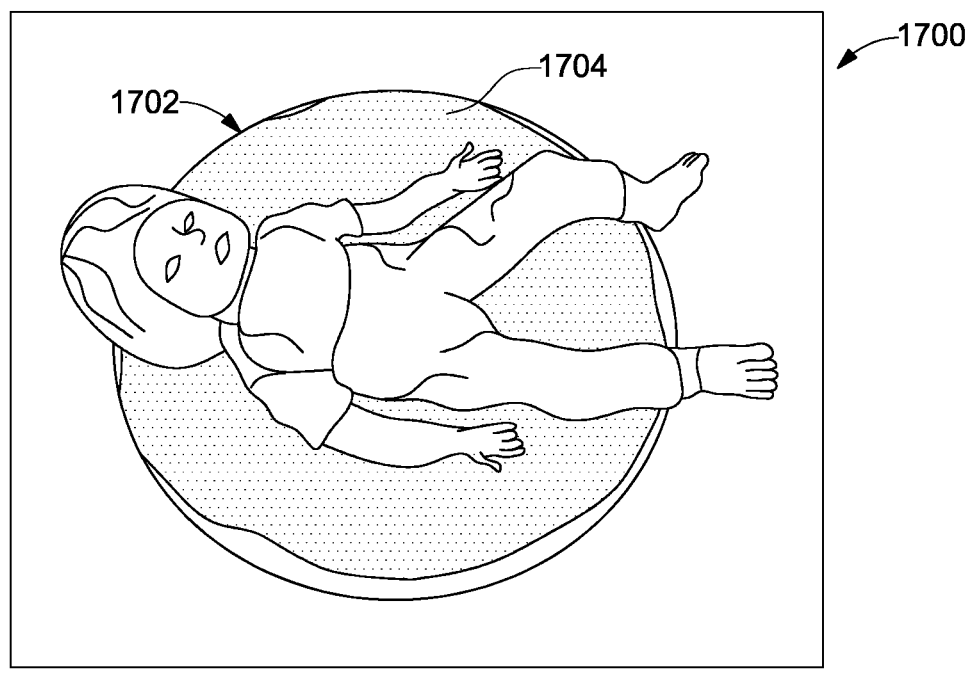
FIG. 17B illustrates a top view of the supporting apparatus of FIG. 17A with a user in the suspender, in accordance with an embodiment of the invention.

Referring now to FIGS. 17A and 17B, a top view of a supporting apparatus 1700 is illustrated in accordance with an embodiment of the invention. FIG. 17A is illustrated without a user, while FIG. 17B is illustrated with a user. As illustrated in FIG. 17A, a central member 1704 of a suspender 1702 may include a simple hammock-like construction with no openings. This embodiment may be more suitable for very small users, such as a newborn or an infant, as they may require greater support than bigger users. Further, in such an embodiment, since legs of the user may also be positioned on or over the periphery of the central member 1704, a cushion padding may be provided on the periphery of the central member 1704 to support the legs of the user.

Figure 18A:
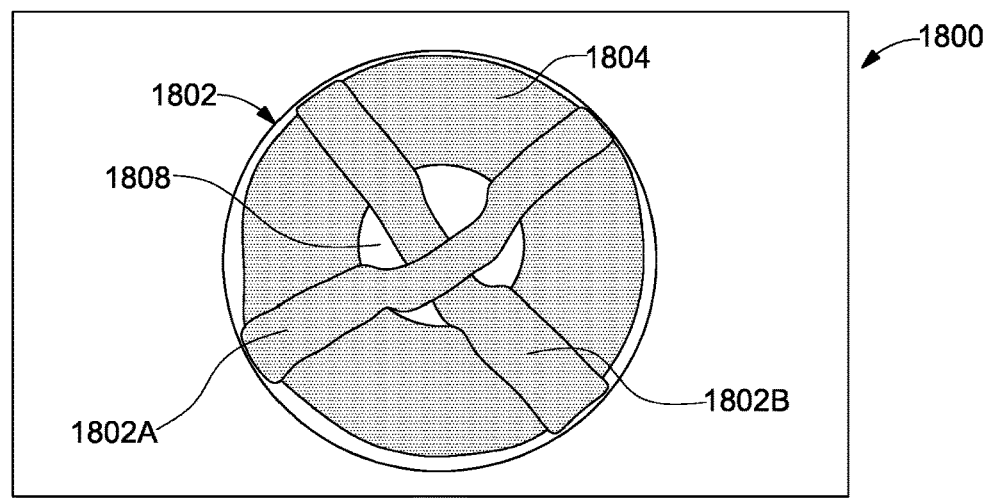
FIG. 18A illustrates a top view of a supporting apparatus with another example of a suspender, in accordance with an embodiment of the invention.
Figure 18B:
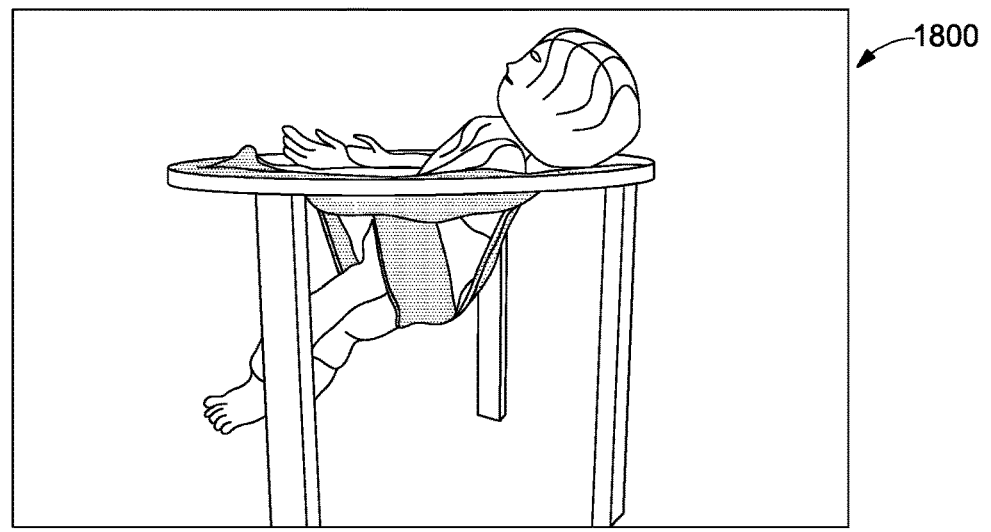
FIG. 18B illustrates a side view of the supporting apparatus of FIG. 18A with a user in the suspender, in accordance with an embodiment of the invention.
Figure 18C:
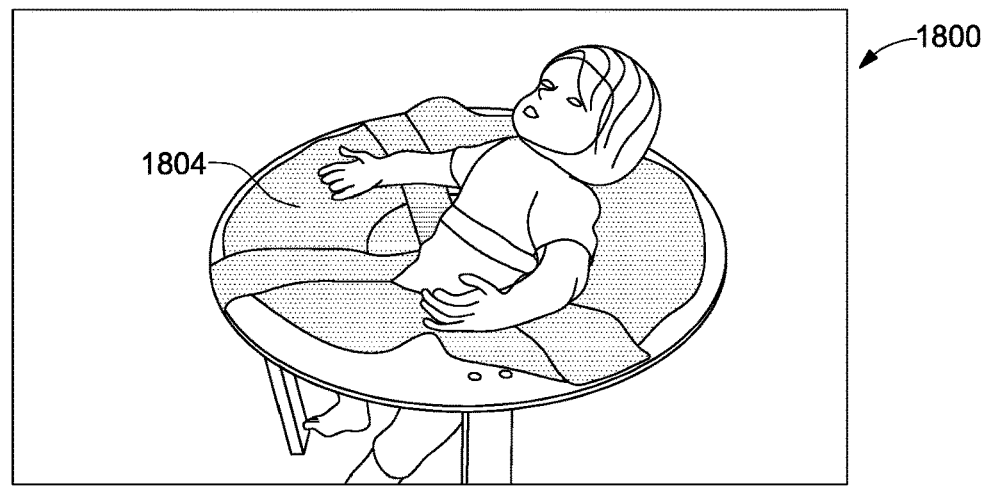
FIG. 18C illustrates a perspective view of the supporting apparatus of FIG. 18A with a user in the suspender, in accordance with an embodiment of the invention.

Referring now to FIGS. 18A through 18C, a top view, a side view with a user, and a perspective view with the user, respectively, of a supporting apparatus 1800 in an open position are illustrated in accordance with an embodiment of the invention. In this embodiment, a central member 1804 may include one central opening 1808. Further, the suspender 1802 may include two straps 1802A and 1802B that may be provided to accommodate the user in the central opening 1808. As illustrated in FIGS. 18B and 18C, the user may be positioned in the central opening 1808 supported by the straps 1802A and 1802B which may be positioned substantially perpendicularly across each other. Further, a ratio of the diameter of the central opening 1808 to the diameter of the central member 1804 may range from about 1:3 to about 1:4. In certain embodiments, the straps 1802A and 1802B may be varied in size and, further, may be removably attached to the central member 1804 such that the size of the central opening 1808 may be varied by removing the straps 1802A and 1802B, varying their length, and reattaching the straps 1802A and 1802B to the central member 1804. Various techniques, generally known in the art, may be utilized to removably attach and vary the length of the straps 1802A and 1802B. The techniques employed may include, for example, a belt mechanism, strap fastener, zipper, Velcro®, buckles, and other techniques.

Figure 19A:
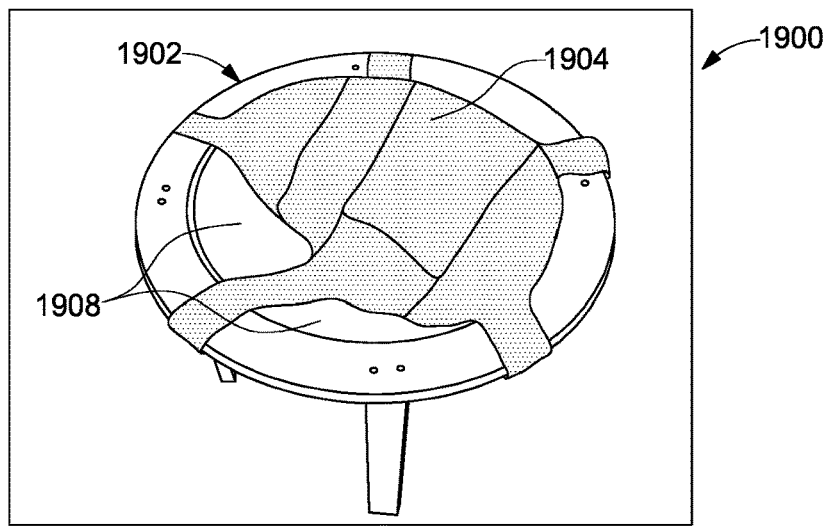
FIG. 19A illustrates a perspective view of a supporting apparatus with another example of a suspender, in accordance with an embodiment of the invention.
Figure 19B:
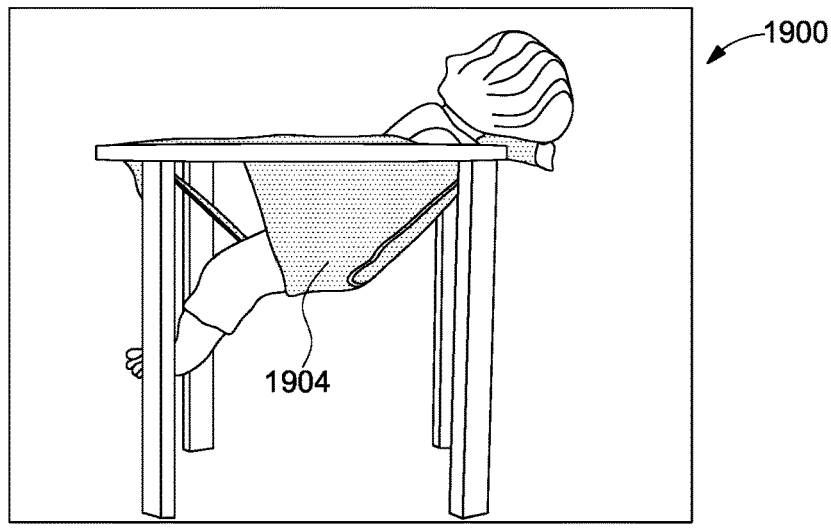
FIG. 19B illustrates a side view of the supporting apparatus of FIG. 19A with a user of in the suspender, in accordance with an embodiment of the invention.
Figure 19C:
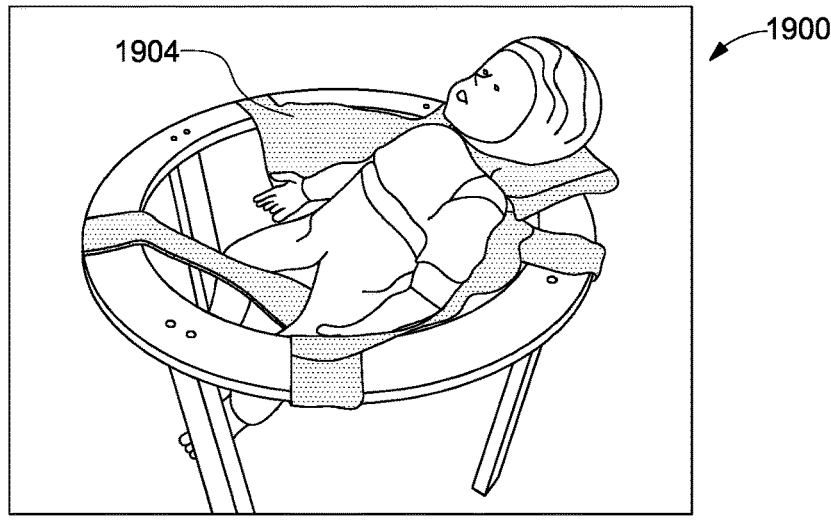
FIG. 19C illustrates a perspective view of the supporting apparatus of FIG. 19A with a user in the suspender, in accordance with an embodiment of the invention.

Referring now to FIGS. 19A through 19C, a top view, a side view with a user, and a perspective view with the user, respectively, of a supporting apparatus 1900 in an open position are illustrated in accordance with an embodiment of the invention. In this embodiment, the central member 1904 has a shape substantially similar to the shape of the central member 1604 illustrated in FIGS. 16A and 16B and may include two large openings 1908 in the central member 1904. Suspender 1902 is also shown. The central member 1904, as illustrated in FIGS. 19A through 19C, may be constructed from a several flat panels of fabric that are attached together, preferably by sewing, to provide a three-dimensional structure to the central member 1904 such that it may support the body of a user more comfortably than the central member 1604 of FIGS. 16A and 16B.

According to another embodiment of the invention, a method of supporting a user on a supporting apparatus 100 is described herein. The method may include various steps for supporting the user on the supporting apparatus 100 for performing an activity, for example, giving the user a bath. At first step, the apparatus 100 may be provided. As mentioned above, the apparatus 100 may include a frame member 102 further including an outer periphery 102A and an inner periphery 102B. The inner periphery 102B may define a plane 102P therewithin. The apparatus 100 may further include a first leg assembly 104 and a second leg assembly 106, each movably attached to the frame member 102. Each of the first leg assembly 104 and the second leg assembly 106 may be configurable between a closed position and an open position. In the open position, each of the first leg assembly 104 and the second leg assembly 106 is aligned at a first angle relative to the plane 102P associated with the inner periphery 102B, the frame member 102 is balanced on the first leg assembly 104 and the second leg assembly 106, and the frame member 102 is raised from ground level by a predetermined height. The first angle may be equal to or greater than 90°, and preferably may range between about 100° to about 130°. In the closed position, each of the first leg assembly 104 and the second leg assembly 106 is aligned at a second angle to the plane 102P associated with the inner periphery 102B. The second angle may range between about 0° to about 10°, and preferably between about 0° to about 5°. The apparatus 100 may further include a suspender 1302 including a central member 1304 and a plurality of straps 1306 extending from the central member 1304.

At a second step, each of the first leg assembly 104 and the second leg assembly 106 may be configured to be in the open position. In the open position, the frame member 102 is elevated from the ground level. Configuring each of the first leg assembly and the second leg assembly to the open position may include manipulating a handle 502C associated a the catch 502, to move the catch 502 from an extended position into a retracted position to disengage a first end 502A of the catch 502 from a second slot 512, rotating the first leg assembly 104 and the second leg assembly 106 until the catch 502 moves into the extended position to engage the first end 502A with a first slot 510, to lock the first leg assembly 104 and the second leg assembly 106 in the open configuration.

At a third step, the suspender 1302 may be fastened to the frame member 102 through the plurality of straps 1306, to position the central member 1304 in the region enclosed by the inner periphery 102B. At a fourth step, upon fastening the suspender 1302 to the frame member 102, a user may be situated on the suspender 1302, to perform an activity related to the user. For instance, giving the user a bath. Situating the user on the suspender 1302 may include passing a limb of the user through a at least one opening 1308 associated with the central member 1304 of the suspender 1302.

At a fifth step, upon completion of the activity, for instance, when the bath is complete, the user may be removed from the suspender 1302, and at a sixth step, each of the first leg assembly 104 and the second leg assembly 106 may be reconfigured into the closed position. Reconfiguring each of the first leg assembly 104 and the second leg assembly 106 in to the closed position may include manipulating the handle 502C associated with the catch 502, to move the catch 502 from the extended position into the retracted position to disengage the first end 502A from the first slot 510, and rotating the first leg assembly 104 and the second leg assembly 106 until the catch 502 moves into the extended position to engage the first end 502A with the second slot 512, to lock the first leg assembly 104 and the second leg assembly 106 in the closed configuration.

From the foregoing it will be appreciated that, although specific embodiments of the invention have been described herein for purposes of illustration, these disclosure and examples should be considered as exemplary only, and various modification may be made without deviating from the true scope and spirit of the invention.

What is claimed is:

1. A supporting apparatus comprising:
   a frame member comprising:
   an outer periphery; and
   an inner periphery, wherein the inner periphery defines a plane therewithin;
   a leg assembly movably attached to the frame member, wherein the leg assembly is configurable between a closed position and an open position; and
   a suspender comprising a central member and a plurality of straps extending from the central member, wherein the suspender is fastened to the frame member through the plurality of straps and wherein the central member is positioned in a region enclosed by the inner periphery of the frame member;
   wherein the leg assembly further comprises a locking mechanism, and wherein the locking mechanism is configured to secure the leg assembly in the closed and the open position; and
   wherein the locking mechanism further comprises:
   a catch comprising:
   a first end configured to engage with a first slot and a second slot and a second end defining a handle, wherein the catch is movable between an extended position and a retracted position, and a spring coupled to the catch and configured to bias the catch in the extended position, wherein the first end is configured to engage with one of the first slot and the second slot when the catch is in the extended position, wherein the first slot and second slot correspond to the open position and the closed position, respectively, of the leg assembly, and wherein the catch is configured to be moved from the extended position into the retracted position by manipulating the handle against the spring.

2. The supporting apparatus of claim 1, wherein in the open position, the leg assembly is aligned at a first angle relative to the plane associated with the inner periphery, wherein the first angle ranges between 90° to 130°, the frame member is balanced on the leg assembly; and the frame member is raised from ground level by a predetermined height.

3. The supporting apparatus of claim 1, wherein in the closed position, the leg assembly is aligned at a second angle relative to the plane associated with the inner periphery, wherein the second angle ranges between 0° to 10°.

4. The supporting apparatus of claim 1, wherein the inner periphery of the frame member is configured in a closed shape.

5. The supporting apparatus of claim 4, wherein the closed shape is one of:

a substantially circular shape;

a substantially ovular shape;

a polygonal shape; or a combination thereof.

6. The supporting apparatus of claim 1, wherein the leg assembly further comprises:

an intermediary section;

a first leg section extending away from the intermediary section; and a second leg section extending away from the intermediary section.

7. The supporting apparatus of claim 6, wherein the leg assembly is attached to the frame member at the intermediary section.

8. The supporting apparatus of claim 6, wherein the leg assembly is attached to the frame member at the intermediary section using a coupling mechanism.

9. The supporting apparatus of claim 6, wherein the frame member further comprises a neck-support section positioned on a upper side of the frame member.

10. The supporting apparatus of claim 6, further comprising a suction cup assembly configured to removably attach to each of the first leg section and the second leg section associated with the leg assembly.

11. The supporting apparatus of claim 10, wearing the suction cup assembly further comprises:

a circular concave suction cup, wherein a bore is defined along center of the circular concave section cup, and a fastener configured to extend through the bore to removably attach the suction cup assembly to each of the first leg section and the second leg section associated with the leg assembly.

12. The supporting apparatus of claim 1, wherein the suspender further comprises at least one opening, each of the at least one opening configured to allow a limb of a user to pass through.

13. A method of supporting a user on an apparatus, the method comprising:

providing the apparatus, where in the apparatus comprises:

a frame member comprising an outer periphery and an inner periphery, wherein the inner periphery defines a plane therewithin;

a leg assembly movably attached to the frame member, wherein the leg assembly is configurable between a closed position and an open position; and a suspender comprising a central member and a plurality of straps extending from the central member;

configuring the leg assembly in the open position, wherein in the open position the frame member is elevated from the ground level;

fastening the suspender to the frame member through the plurality of straps, to position the central member in a region enclosed by the inner periphery of the frame member;

laying the user on the suspender, to perform an activity related to the user;

upon completion of the activity, removing the user from the suspender; and configuring the leg assembly into the closed position;

wherein configuring the leg assembly in the open position further comprises:

manipulating a handle associated with a catch to move the catch from an extended position into a retracted position to disengage a first end of the catch from a second slot, rotating the leg assembly until the catch moves into the extended position to engage the first end of the catch with a first slot to lock the leg assembly in the open configuration; and wherein configuring each of the first leg assembly and the second leg assembly in the closed position further comprises:

manipulating the handle associated with the catch, to move from the extended position into the retracted position to disengage the first end of the catch from the first slot, and rotating the leg assembly until the catch moves into the extended position to engage the first end of the catch with the second slot, to lock the leg assembly in the closed configuration.

14. The method of claim 13, wherein in the open position, the leg assembly is aligned at a first angle relative to the plane associated with the inner periphery, wherein the first angle ranges between 90° to 130°, the frame member is balanced on the leg assembly, and the frame member is raised from ground level by a predetermined height; and wherein in the closed position, the leg assembly is aligned at a second angle relative to the plane associated with the inner periphery, wherein the second angle ranges between 0° to 5°.

15. The method of claim 13, wherein laying the user on the suspender further comprises passing a limb of the user through at least one hole associated with the central member of the suspender.

16. A supporting apparatus comprising:

a frame member comprising:

an outer periphery; and an inner periphery, wherein the inner periphery defines a plane therewithin;

a leg assembly movably attached to the frame member, wherein the leg assembly is configurable between a closed position and an open position; and a suspender comprising a central member and a plurality of straps extending from the central member, wherein the suspender is fastened to the frame member through the plurality of straps and wherein the central member is positioned in a region enclosed by the inner periphery of the frame member;

wherein the leg assembly further comprises:
   an intermediary section;
   a first leg section extending away from the intermediary section; and a second leg section extending away from the intermediary section;
   further comprising a suction cup assembly configured to removably attach to each of the first leg section and the second leg section associated with the leg assembly.

* * * * *